Patented Sept. 6, 1949

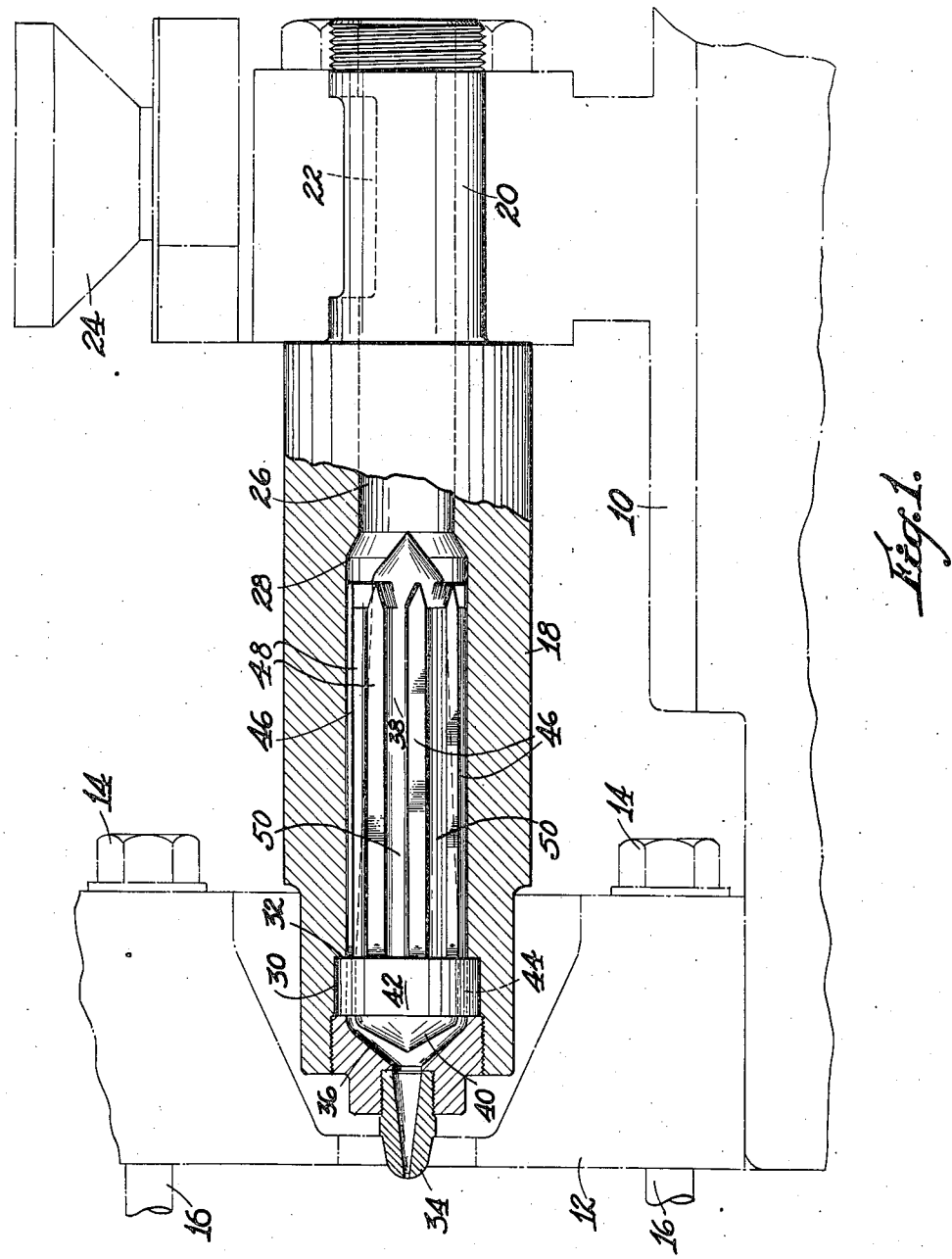

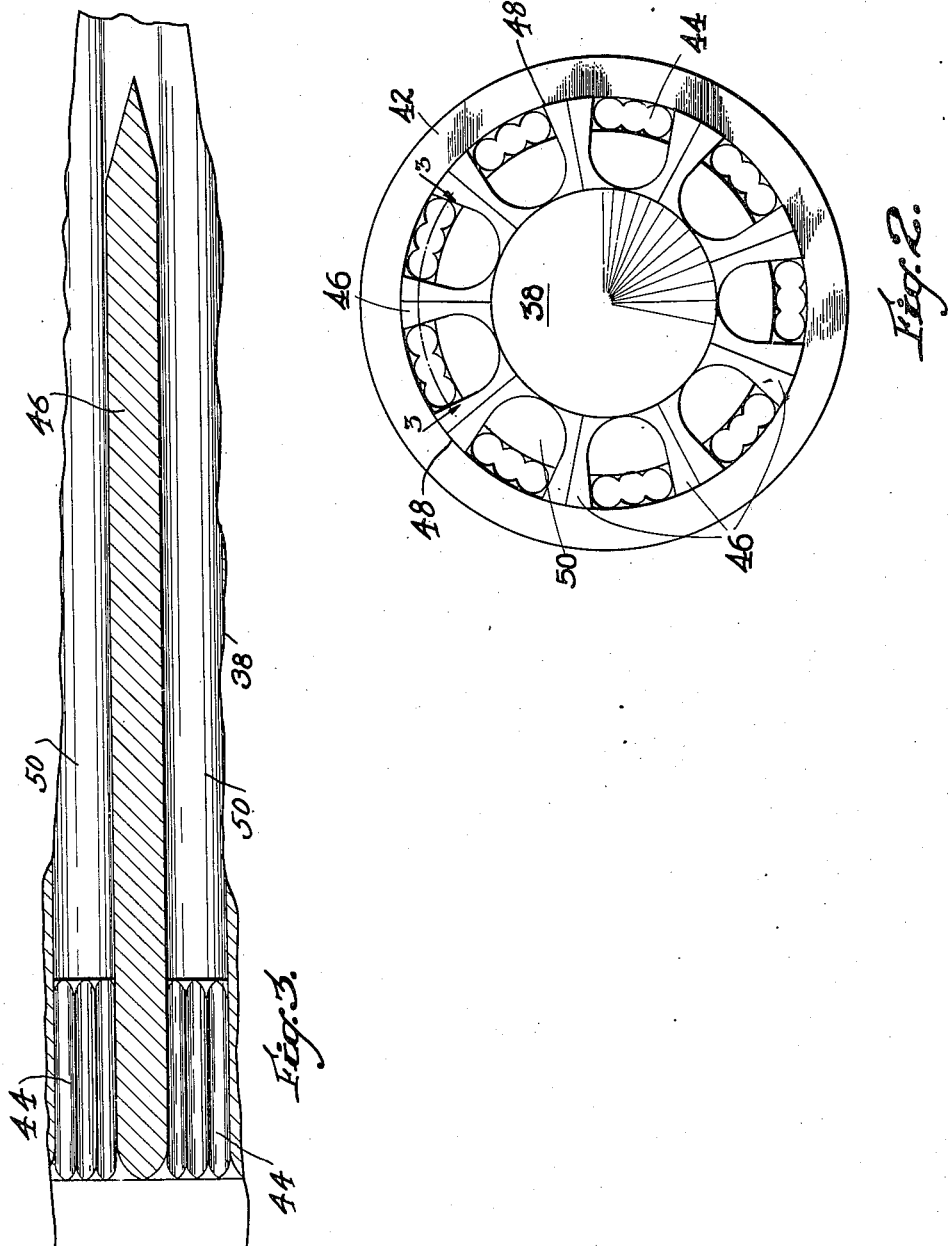

2,480,838

UNITED STATES PATENT OFFICE 2,480,838

HEATING CYLINDER FOR INJECTION MOLDING MACHINES

Ludger J. Caron, Leominster, Mass., assignor to Leominster Tool Company, Inc., Leominster, Mass., a corporation of Massachusetts Application July 19, 1946, Serial No. 684,666

2 Claims. (Cl. 18—30)

1

This invention relates to improvements in heating cylinders particularly adapted for plastic injection molding machines.

The principal objects of the invention include the provision of an improved heating apparatus for the purpose described wherein the transfer of heat from a conventional heating unit into the heating cylinder is facilitated by a novel construction comprising a separator located in the cylinder and having a series of elongated fins each of which has a free edge in broad close contact with the interior wall of the cylinder, said fins extending substantially the length of the separator and thereby providing for uniform and more complete heat transfer to the separator; and thus to the molding material and the provision of a construction improving the completeness of plasticizing action in the heating cylinder and comprising a series of grooves formed by said fins, said grooves gradually tapering down from one end of the separator in the direction of the injection nozzle so that the material to be molded is more highly compressed as it progresses toward the nozzle, under uniform and improved heat conditions as above described.

Further objects of the invention include the provision of a heating cylinder having a cylindrical hollow interior wherein is located an elongated separator which tapers toward the admission end of the cylinder, said separator being provided with a flange at its widest portion adjacent the nozzle, said flange being provided with a series of restricted passages leading from the smaller ends of the aforementioned grooves to the nozzle and further restricting the size of the grooves so as to more completely plasticize the molding material immediately prior to the injection operation.

Still further objects of the invention reside in the provision of a one piece integral heating and plasticizing cylinder, the construction of which provides for more even and greater transference of heat from a conventional heating element to the interior thereof for improved plasticization of the molding material.

Other objects and advantages of the invention will appear hereinafter.

Reference is to be had to the accompanying drawings in which

Fig. 1 is a view showing the heating cylinder in section and the separator therefor in elevation, Fig. 2 is an enlarged view of the separator looking toward the narrow end thereof, and Fig. 3 is a section on line 3—3 of Fig. 2.

As shown in Fig. 1, there is a base 10 on which

2 may be supported a die block or platen 12 secured by bolts 14 on rods 16, a movable die not shown, being reciprocable on these rods to open and close the dies.

The heating cylinder is shown generally at 18 and is supported on the base 10. This heating cylinder is provided with a narrow portion 20 having an opening therein at 22 to receive the molding material as from a hopper 24. As is conventional in the art, there is provided an injection plunger, not shown, but which is received in a bore 26 communicating with opening 22 for the purpose of feeding the molding material through the cylinder 18.

The heating cylinder is provided with an enlarged cylindrical bore at 28, this bore extending to an enlargement 30 forming a shoulder 32. At this end of the cylinder there is provided a nozzle 34. The cylindrical portion 28 terminates at the nozzle in a conical portion 36.

A separator 38 is located in the cylindrical portion 28 and is provided with a forward sharply tapered end 40 which forms a chamber with surface 36 for passage of the molding material to the nozzle. The separator is elongated and tapers down toward the entrance end of the cylinder and away from the nozzle as clearly shown in Fig. 1, and at its widest portion is provided with a flange 42 which abuts shoulder 32 and locates the separator relative to the nozzle. This flange is provided with a series of small openings 44 which form narrow passages between the nozzle and the surface of the separator to the right of the flange 42 in Fig. 1, it being noted that the widest diameter of the separator is less than the diameter of cylinder 28.

Extending from the flange substantially the full length of the separator there are provided a series of fins 46 which are provided with parallel straight edges indicated at 48 in Fig. 2. It will be noted that these edges are made with relatively wide surfaces for broad contact with the interior wall of the cylinder 18, and this construction provides for very efficient heat transfer from cylinder 18 to the body of the separator 38 so that the molding material located between the fins is extremely well heated for the plasticizing action and the heat will be conducted to the center of the separator to be thrown off into the molding material so that the latter is evenly heated throughout.

The fins 46 provide between them a series of grooves 50 which gradually taper down in a direction toward the flange 42 thus continuously and progressively restricting the passage for the molding material. This construction provides for increased plasticization in addition to improved heating and when the molding material reaches flange 42 it is still further squeezed in the restricted passages 44 just before injection.

It will be seen that this invention provides an improved heating cylinder and separator construction for improved heat conduction to the plastic material and for improved plasticization due to the groove construction and the restricted passages 44, and it is to be noted that the conduction of heat from the heating cylinder 18 takes place throughout the entire length of the separator right up through the flange.

Having thus described my invention and the advantages thereof, I do not wish to be limited to the details herein disclosed, otherwise than is set forth in the claims, but what I claim is:

1. Device of the class described comprising a cylinder, a nozzle at one end thereof, said cylinder being provided with a molding material ingress at the opposite end, a tapered elongated separator between the nozzle and ingress, a plurality of fins extending along the separator and forming relatively narrow tapering grooves therebetween, a flange at the nozzle end of the separator, said fins and grooves terminating at the flange, said flange having apertures therethrough communicating with the nozzle, the grooves tapering down to a minimum at the flange.

2. In a device of the class described, a hollow cylinder, a nozzle at one end thereof, an annular shoulder in said cylinder adjacent the nozzle, an elongated separator in the cylinder, a flange on the separator at the widest part thereof, said flange abutting the shoulder and being provided with relatively small through apertures located within the cylinder, said separator being provided with a series of longitudinal grooves on the surface thereof said grooves tapering from an end of the separator to narrow toward the flange, said apertures further restricting the grooves and forming passages therefrom to the nozzle.

LUDGER J. CARON.

REFERENCES CITED

The following references are of record in the file of this patent:

UNITED STATES PATENTS

| Number | Name | Date |
|---|---|---|
| 2,057,945 | Gastrow | Oct. 20, 1936 |
| 2,191,882 | Ernst et al. | Feb. 27, 1940 |
| 2,253,627 | Knowles | Aug. 26, 1941 |
| 2,308,867 | Dinzl | Jan. 19, 1943 |